United States Patent
Pruss

(10) Patent No.: US 8,506,132 B2
(45) Date of Patent: Aug. 13, 2013

(54) METHOD AND APPARATUS FOR CREATING HIGH EFFICIENCY RADIAL CIRCULAR LIGHTING DISTRIBUTIONS FROM A HEMISPHERICAL LAMBERTIAN SOURCE

(75) Inventor: Mark Bryan Pruss, Coal City, IL (US)

(73) Assignee: Dragonfish Technologies LLC, Richland, MI (US)

( * ) Notice: Subject to any disclaimer, the term of this patent is extended or adjusted under 35 U.S.C. 154(b) by 10 days.

(21) Appl. No.: 12/246,298

(22) Filed: Oct. 6, 2008

(65) Prior Publication Data
US 2009/0122557 A1    May 14, 2009

Related U.S. Application Data

(60) Provisional application No. 60/977,516, filed on Oct. 4, 2007.

(51) Int. Cl.
*F21V 5/02* (2006.01)
(52) U.S. Cl.
USPC ........... 362/328; 362/305; 362/477; 362/518; 362/800

(58) Field of Classification Search
USPC ............... 362/305, 303, 307, 477, 327, 518, 362/297, 326, 328
See application file for complete search history.

(56) References Cited

U.S. PATENT DOCUMENTS

| | | | | |
|---|---|---|---|---|
| 5,890,794 | A * | 4/1999 | Abtahi et al. | 362/294 |
| 6,679,621 | B2 * | 1/2004 | West et al. | 362/327 |
| 6,951,415 | B2 * | 10/2005 | Amano et al. | 362/520 |
| 6,953,271 | B2 * | 10/2005 | Aynie et al. | 362/511 |
| 7,118,262 | B2 * | 10/2006 | Negley | 362/555 |
| 7,152,985 | B2 * | 12/2006 | Benitez et al. | 359/857 |
| 7,438,445 | B2 * | 10/2008 | Shiau et al. | 362/333 |
| 7,566,148 | B2 * | 7/2009 | Noh et al. | 362/305 |
| 7,602,559 | B2 * | 10/2009 | Jang et al. | 359/726 |
| 2006/0061990 | A1 * | 3/2006 | Chinniah et al. | 362/247 |

* cited by examiner

*Primary Examiner* — Jong-Suk (James) Lee
*Assistant Examiner* — Leah S Macchiarolo
(74) *Attorney, Agent, or Firm* — Boyle Fredrickson, S.C.

(57) ABSTRACT

A ring generating LED lamp includes a lens section which employs internal reflection to direct the light energy from a hemispherical emitter into a ring shaped output distribution. The ring shaped distribution projects above and below the plane of the LED source. The lens has multiple internal surfaces that direct light from the LED source to provide a ring shaped output distribution.

17 Claims, 3 Drawing Sheets

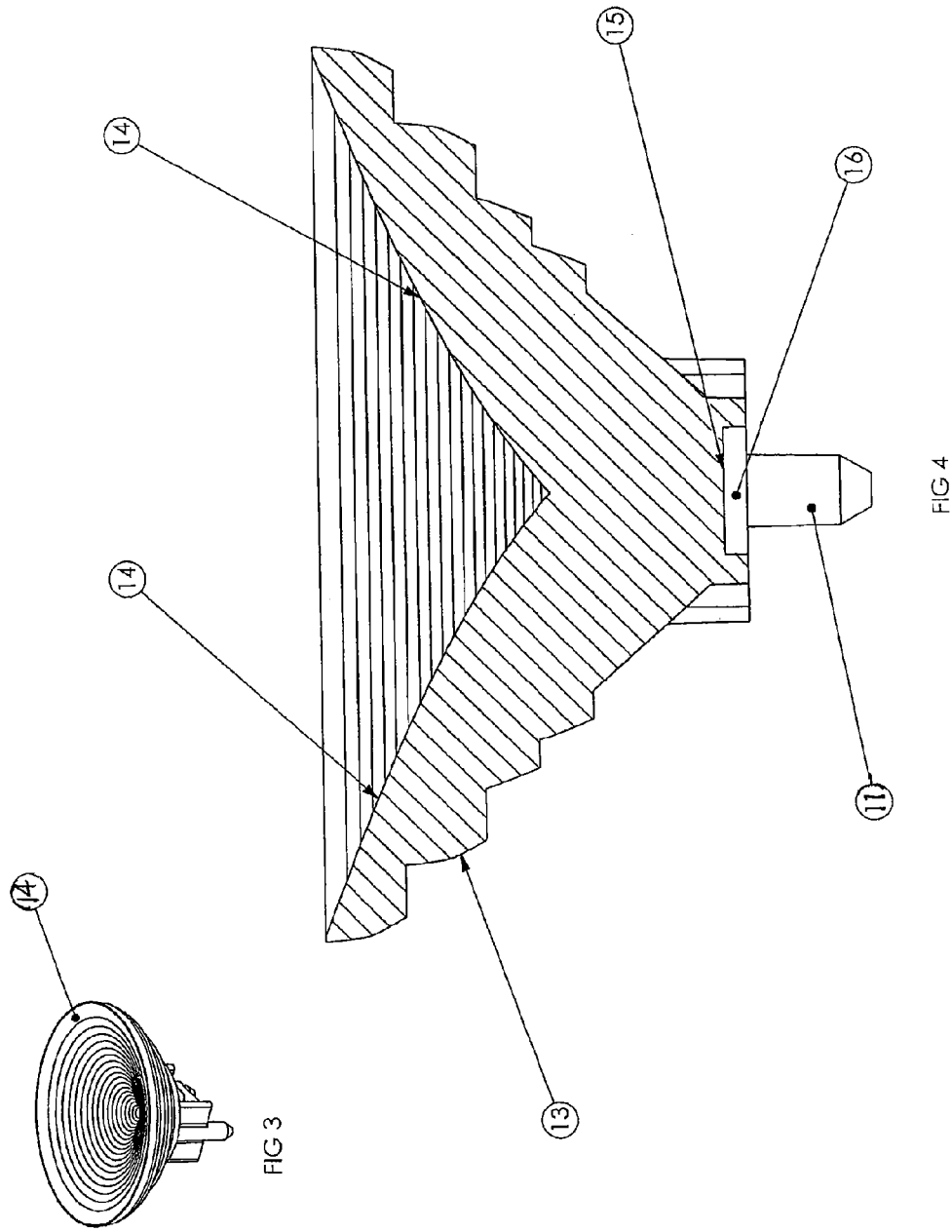

METHOD AND APPARATUS FOR CREATING HIGH EFFICIENCY RADIAL CIRCULAR LIGHTING DISTRIBUTIONS FROM A HEMISPHERICAL LAMBERTIAN SOURCE

CROSS-REFERENCE TO RELATED APPLICATION

The present application claims the benefit of U.S. Ser. No. 60/977,516, filed Oct. 4, 2007, entitled "Method And Apparatus For Creating High Efficiency Radial Circular Lighting Distributions From A Hemispherical Lambertian Source", the disclosure of which is incorporated herein in its entirety by reference.

FIELD OF THE INVENTION

The present invention relates generally to the redistribution of radiant, particularly electromagnetic energy, for regulated lighting systems. More particularly, the invention is directed to the efficient distribution of light energy from a conical wide-angle light source into a substantially even intensity radially distributed band of light.

BACKGROUND OF THE INVENTION

There are many situations in which electromagnetic energy is to be distributed into an evenly distributed ring shaped output requirement. In the vast majority of these situations, a high efficiency transfer of source energy is desirable. This is particularly true in regulated lighting. For example overland vehicle safety lighting, aircraft lighting, and marine lighting are examples that require specific light distribution patterns that are generally mandated by government regulations to have minimum and maximum illumination values. In most cases, a minimum photometric or radiometric output must be met by the illumination device. In many safety lighting cases, the output distribution requirements consist of an intensity distribution revolved around a vertical lighting axis. The typical requirements have a 360 degree ring shaped or a less than 360 degree partial ring distribution having the characteristic that for any cone projecting from the source intersecting the requirement results in a constant intensity distribution throughout the conical section.

For example, a 2 mile rated stem light requires an even minimum intensity of 4.2 Candellas (Cd) for 360 degrees in the horizontal plane and for +/−5 degrees in an orthogonal vertical plane as measured by a type A goniometer. Lamps of this type are typically mounted on a pole with an incandescent source, the source filament is oriented vertically and the light projecting from the sides of the filament is concentrated in a vertical direction and is emitted in a 360 degree circle around the vertical axis of the lamp. In another example the light energy of the previous example is attenuated by an opaque light shield creating a 135 degree section of a ring in the horizontal direction.

Light Emitting Diodes (LEDs) are solid state electrical devices with high efficiencies and long lives as compared to other light sources. LEDs are generally impact resistant, use very little power and often have 100,000 hour life spans. These features make these devices preferable for use in safety lighting. The primary disadvantage of LED light sources however is their cost. If the efficiency of an optical device to distribute light from the LED into the required or regulated pattern is improved, fewer LEDs can be used resulting in more cost accessible interior illumination and safety lighting devices.

It is also worth noting that in the case of LED devices, the diode chip which provides the illumination must be kept to a minimum temperature. Higher LED temperature results in reduced product life and can change the output color and intensity of the LED. Thus, there remains a need for a cost-affordable lamp using LEDs to provide a substantially even intensity ring shaped output distribution.

Recently, LED manufacturers have turned to surface mountable LED devices that have superior heat removal from the diode junction and higher optical flux per watt. These devices are now being regularly provided with a flat output surface free from the source distorting optics of past LEDs. These devices typically have very wide output distributions with typical viewing angles greater than 100 degrees. The viewing angle is typically defined as the full angular width of the optical distribution where the light output reaches 50% of the intensity measured on the optical axis. LEDs of this type have generally symmetrical outputs around the center or optical axis. Thus, a device having a viewing angle of 10 degrees describes a conical output distribution where 50% of the peak intensity value occurs at 5 degrees from the optical or center axis of the device. A 120 degree viewing angle device, which is a very common wide output angle LED, defines a device which has an output intensity of 50% at an angle of 60 degrees from the optical axis. These LED's have output intensity distributions which closely follow a lambertian plane source emitter and emit light in a 180 degree hemisphere.

The increased availability of high output LEDs with hemispherical output and intensity closely following that of a Lambertian plane emitter has provided a unique opportunity for the development of new optical lens shapes for meeting government requirements. These LEDs output a highly diffused illumination pattern with a very predictable intensity distribution closely following the trigonometric cosine function.

In order to efficiently meet ring shaped light requirements for a marine navigation light application using a hemispherical emitting LED, the energy must be collected, concentrated and directed to the side and below the plane of the source. In order to redirect the light energy greater than 30 degrees form its emission direction it is advantageous to use reflection to change the light direction. Reflective surfaces can be created using metallization, dielectric coatings or by total internal reflection inside a transparent material. In production dielectric coatings are often too expensive and are difficult to create on a curved surface. Metallic coating type reflectors typically have light absorption levels of 20% or more. This makes it more desirable to use internal reflection whenever possible.

Internal reflection occurs when electromagnetic energy traveling through a transparent material strikes an outer surface at an angle to the surface normal greater than the critical angle for the material. One hundred percent of the light energy is reflected back into the lens material on a path according to the laws of reflection.

The ideal shape of a reflector for an expanding source to be redirected into a ring shaped pattern is an inverted cone. The sides of the cone are ideally non-linear and are shaped in a manner which allows the light energy to be concentrated and substantially directed toward the final output ring requirement.

In many cases, internal reflection results in thick cross-section lens material and long beam paths inside the material. Thick materials are inherently difficult to mold as most materials shrink when cooling creating internal stresses and surface deformations in the final part. Also, these thick materials often have long beam paths resulting in a need for high clarity materials to minimize beam attenuation.

SUMMARY OF THE INVENTION

The present invention is directed to a ring generating LED lamp that overcomes the aforementioned drawbacks. The lamp includes a lens section which employs internal reflection to direct the light energy from a hemispherical emitter into a ring shaped output distribution. The ring shaped distribution projects above and below the plane of the LED source.

Light from the LED with an optical axis oriented in the vertical direction source strikes a first flat lens surface. Light from the LED source entering the material is bent toward the surface normal compressing the hemispherical waveform into a cone having an angle equal to two times the critical angle for the material. For acrylic material this results in a cone having a width inside the material of about 84 degrees.

The light inside the material is directed to strike a second surface angled to be greater than the critical angle of the material creating total internal reflection of the beam energy and directing the light to the side and a few degrees downward toward the source.

The light energy projecting to the side strikes an outer third surface. The outer surface is shaped such that the light energy exits the lens material and enters the output pattern. An additional feature of the outer surface is that it is broken into several individual facets having progressively smaller radii as they approach the plane of the pcb. This results in a significantly reduced lens thickness making the lens manufacturable using standard injection molding processes.

It is therefore an object of the present invention to provide an improved non-imaging optical lens apparatus for the high efficiency creation of ring shaped output patterns.

It is a further object of the present invention to provide a higher efficiency and lower cost approach to the design and manufacture of ring shaped output lamps.

It is yet a further object of the present invention to provide vehicle lights such as marine vessels navigation lighting that is both efficient and cost effective.

BRIEF DESCRIPTION OF THE DRAWINGS

FIG. 3 is an isometric view of a 360 degree marine stem light inner lens made in accordance with one embodiment of the present invention.

FIG. 4 is a section view of the lens of FIG. 3 made in accordance with one embodiment of the present invention.

DETAILED DESCRIPTION

As will be described herein, the present invention relates to an improved ring shaped light pattern generating method and devices and lenses made therefrom. The lenses and devices have wide ranging uses in various applications including portable lamps and specialty lighting, homes, over-land vehicles, watercraft, aircraft and manned spacecraft electric cars, airplanes, helicopters, space stations, shuttlecraft and the like.

Figure 1:
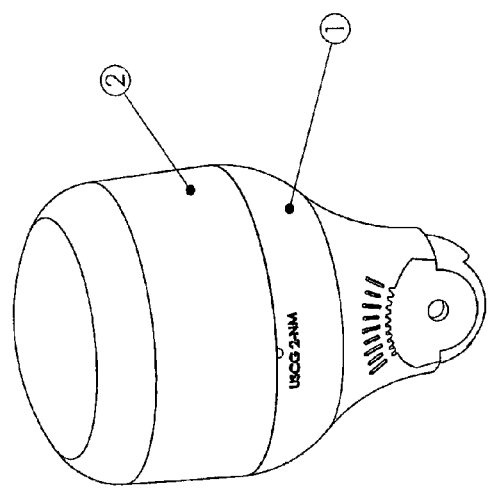
FIG. 1 is view of an LED based marine 360 degree stern light in accordance with one embodiment of the present invention.

Referring now to FIG. 1, the exterior of a 360 degree output marine stem lamp which meets the coast guard requirement for a two mile navigation light. The lamp assembly includes a transparent lens cover 2 connected to an opaque black plastic base 1 and protecting the internal electronic components of the lamp.

Figure 2:
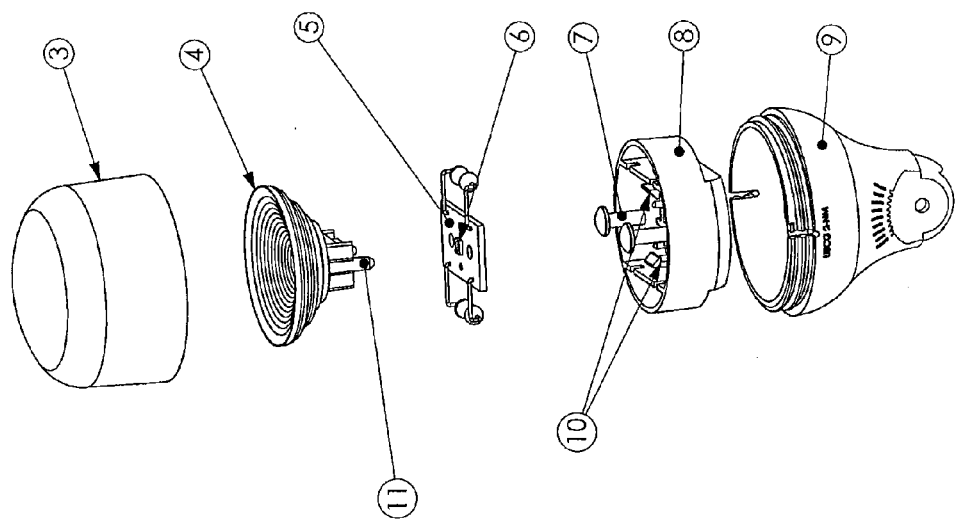
FIG. 2 is an exploded view of the stem light of FIG. 1 in accordance with the present invention.

FIG. 2 is an exploded view of the edge view of the assembly shown in FIG. 1 depicting the preferred assembly required to make a stern lamp in accordance with the present invention. Transparent lens cover 3 threads on to base 9 protecting components 4 through 8 from the environment. Potting and assembly cup 8 is attached to base 9 by two screws 7. The pcb assembly 5 includes an LED source 6 and snapps into potting cup 8 and is retained by snap features 10. The LED source 6 is pushed into the base of lens 4 which directs the light outward in the ring pattern required by the US coast guard for an all around marine stern light. The inner lens 4 is aligned by pins 11 to printed circuit board assembly 5 to achieve a high degree of accuracy in alignment to the LED source 6.

FIG. 3 is a view of the lens which transforms the output from the hemispherical source into the ring shaped pattern of the interior lamp. The inverted internally reflective surface 14 is clearly visible.

FIG. 4 is a section view of the lens of FIG. 3. When mounted in accordance with this embodiment of the present invention the hemispherically emitting LED source is inserted into pocket 16 and its light energy is directed through surface 15 into the transparent lens material. The alignment pins 11 are used to center the LED source on the axis of revolution of the lens. The light energy is directed upward in the figure toward surface 14 which has a non-flat shape designed to use internal reflection to direct the light energy substantially in the horizontal direction in the figure with the light having some spread in the vertical direction. It is important to note that the shape of surface 14 gives substantial control over the intended light distribution in the vertical direction. The now ring shaped light energy strikes an arrangement of outer surfaces 13 and is further shaped in the vertical direction to create the intended output distribution and lens appearance. A significant feature of the present invention is the stepped nature of the arrangement of lens surfaces 13 which greatly reduces the overall part thickness allowing the optic to be manufactured using standard injection molding processes.

Figure 5:
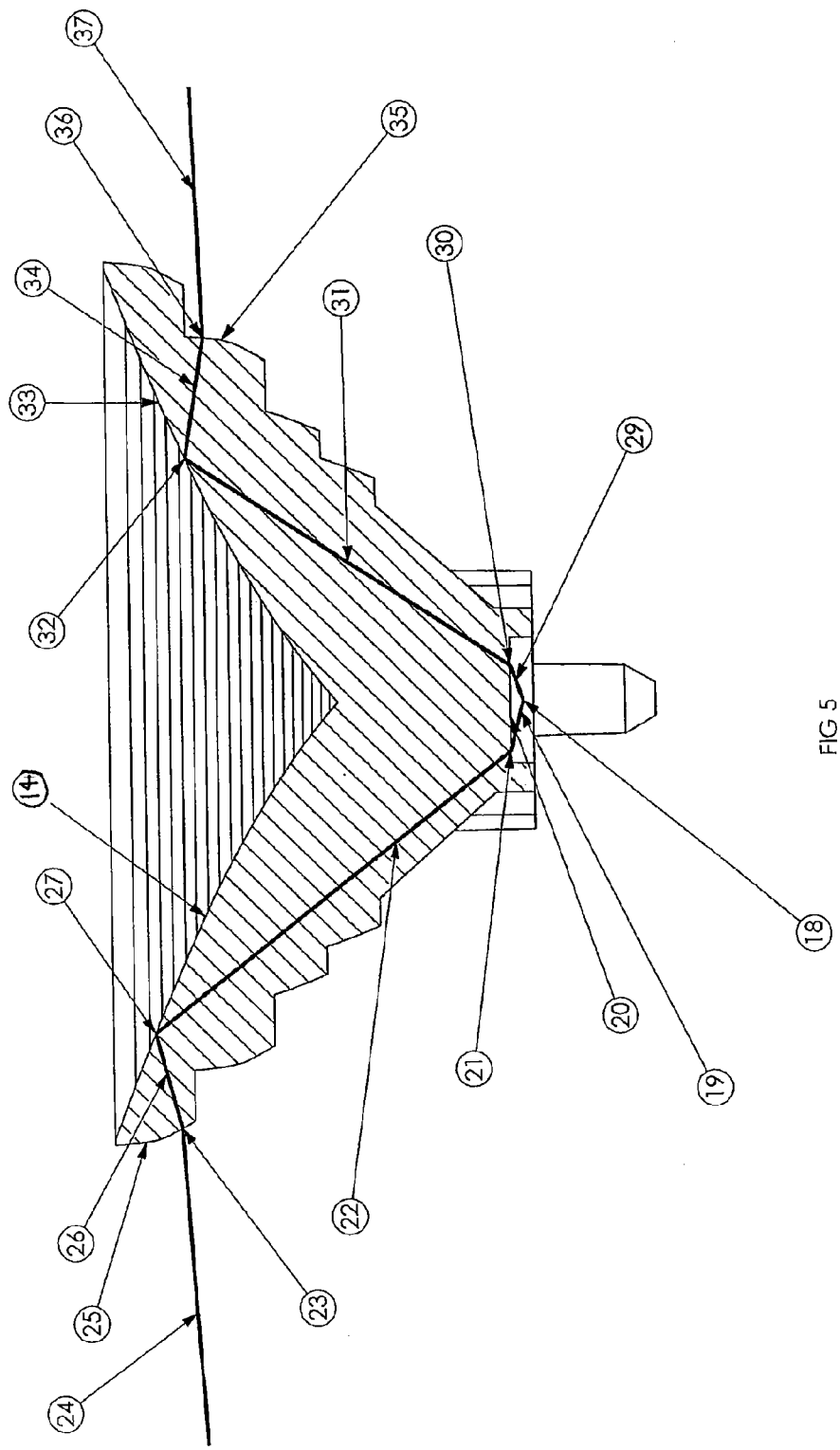
FIG. 5 is the same section view as FIG. 4 of a 360 degree marine stem light lens depicting two rays passing through the material as made in accordance with one embodiment of the present invention.

FIG. 5 is the section view of FIG. 4 depicting two light rays emitting from the LED focal point 18. The first ray 19 strikes surface 20 at point 21 and refracts into the lens material along path 22 striking inner surface 14 at point 27. The surface angle at the point of contact for the ray is designed to be greater than the critical angle for the material causing the 100% of the light energy to be reflected on path 26 horizontally and slightly downward to contact surface 25 at point 23. The light energy refracts out of the material along path 24 and is refracted upward into the ring shaped requirement of the marine navigation light.

A second ray 29 emits from focal point 18 toward surface 20 and strikes the surface at point 30 refracts along path 31 toward point 32. This ray strikes surface 33 and experiences 100 percent total internal reflection and projects along path 34 toward outer surface 35 where it strikes at point 36 refracting into the beam pattern along path 37.

It will be appreciated that the present invention provides an energy efficient method for distributing a wide output diffuse source of electromagnetic radiation (light) into a pre-determined ring shaped requirement. Wide output light distributions can be generated from nearly any source including but not limited to incandescent lamps, LEDs, arc and gas discharge lamps.

In order to create a device or lens of the present invention, it is preferred to first determine the parameters of the device, including the requirement and intensity to be projected and the light source to be used. Once these parameters are ascertained, an appropriate optic can be shaped by a wide variety of computerized software lens optimization algorithms or spreadsheet based techniques.

The manufacturing of a lens in accordance with the present invention may be accomplished through a variety of processes including but not limited to injection molding, directly cutting the optic into transparent material and polishing the surface and other known and to-be-developed techniques. One preferred method for commercial production of such a device is injection molding because of the complex shapes of the lens. Further, the lens can be made of any material transparent to electromagnetic energy or light including but not limited to polycarbonate, acrylic, polystyrene, and glass.

A wide variety of computational algorithms in spreadsheets or software can be used to compute an appropriate surface shape for the lens. In using such algorithms, particular attention should be paid to the percent transmission of the light at higher angles of incidence to the surface normal and the output waveform distortion at high angles of incidence. The algorithms must also be constrained in an appropriate manner such that manufacturable surfaces are computed.

The angle of refraction of light through a surface is governed by Snells law. Snell's law gives the relationship between angles of incidence and refraction for a wave impinging on an interface between two media with different indices of refraction. Like any continuous mathematical function Snells law can be approximated by a linear function when considered over a sufficiently small angle.

LEDs as with all commercial electrical light sources generate heat. Although the LED efficiency is higher than many sources the heat generated must still be removed. Excess heat degrades the performance of the LED and shortens its lifespan. LED lamps must therefore be designed with proper heat sinking to maintain product performance and life. Accordingly, various heat sinking devices may be used, including printed circuit board PCB vias soldered full, heavy copper PCBs, thermally conductive potting materials, thermally conductive plastics, and metal heat sinks.

References to electromagnetic radiation or light in this application are intended as references to the entire electromagnetic spectrum, including the visible spectrum and all non-visible wavelengths including but not limited to infrared, ultraviolet, x-ray, gamma ray and microwave.

The present invention may be implemented in a variety of configurations, using certain features or aspects of the several embodiments described herein and others known in the art. Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter disclosed herein.

I claim:

1. A lamp comprising:
    a central axis;
    a hemispherical light emitter; and
    a lens associated with the hemispherical light emitter and shaped to direct light emitted by the hemispherical light emitter into a ring shaped output distribution, wherein the lens has a first surface to direct light from the light emitter toward a second internally reflective surface configured to reflect and redirect substantially all of the light emitted by the hemispherical light emitter onto a third refractive surface comprising a plurality of facets having progressively smaller radii as the facets approach the plane of the hemispherical light emitter, wherein the third refractive surface refracts light out of the lens in the ring shaped output distribution projecting both above and below a plane orthogonal to the central axis.

2. The lamp of claim 1 wherein the hemispherical light emitter is an LED.

3. The lamp of claim 2 wherein the first surface is flat and wherein the second internally reflective surface inclines radially away from the first surface and is curved.

4. The lamp of claim 2 further comprising a potting cup and the LED is adapted to snap-fittingly engage the potting cup.

5. The lamp of claim 4 further comprising a base and wherein the potting cup is fastened to the base by at least one fastener.

6. The lamp of claim 5 wherein the base includes a set of threads, and further comprising a cover having a set of threads, and wherein the cover is configured to thread onto the base.

7. The lamp of claim 4 further comprising a printed circuit board snap-fit to the potting cup and wherein the LED is affixed to the printed circuit board.

8. The lamp of claim 1 wherein the lens is formed using injection molding.

9. A lens comprising:
    a central axis;
    a first flat surface that refracts light incident thereon along a first non-collimated light path;
    a second curved surface positioned relative to the first flat surface to receive light along the first light path and internally reflect substantially all of the light along a second light path; and
    a third outer surface positioned relative to the second flat surface to receive light along the second light path and redirect the light along a third light path that is generally perpendicular to the central axis and projects outwardly in a ring shaped distribution above and below a plane perpendicular to the central axis.

10. The lens of claim 9 wherein the first flat surface, the second curved surface, and the third outer surface are formed using injection molding.

11. The lens of claim 9 wherein the third outer surface comprises a plurality of facets, having progressively smaller radii as the facets approach the first flat surface such that the radius of a facet closer in to the first flat surface is smaller than the radius of a facet farther away from the first flat surface.

12. A marine lamp comprising:
    a central axis;
    a hemispherical light emitter; and
    a lens associated with the hemispherical light emitter having a first surface to direct light from the hemispherical light emitter toward a second internally reflective surface configured to reflect and redirect substantially all of the light emitted by the hemispherical light emitter toward a third refractive surface comprising a plurality of facets having progressively smaller radii as the facets approach the plane of the hemispherical light emitter, and wherein the third refractive surface refracts light out of the lens into a ring shaped output distribution projecting within about +/−10 degrees above and below a plane orthogonal to the central axis.

13. The marine lamp of claim 12 wherein the hemispherical light emitter is an LED.

14. The marine lamp of claim 12 wherein the lens has a first substantially flat lens surface, a second curved lens surface, and an outer surface and
wherein:
- light emitted by the hemispherical emitter strikes the first substantially flat lens surface and is refracted to strike the second curved lens surface;
- the second curved lens surface reflects the light horizontally and downward at angle toward the emitter; and
- the reflected light is refracted upward into the ring shaped output distribution.

15. The marine lamp of claim 12 wherein the lens is formed of an acrylic material.

16. The marine lamp of claim 12 wherein the light emitter is an incandescent lamp.

17. The marine lamp of claim 12 wherein the light source is a gas discharge lamp.

* * * * *

UNITED STATES PATENT AND TRADEMARK OFFICE
CERTIFICATE OF CORRECTION

PATENT NO.       : 8,506,132 B2
APPLICATION NO.  : 12/246298
DATED            : August 13, 2013
INVENTOR(S)      : Mark Bryan Pruss It is certified that error appears in the above-identified patent and that said Letters Patent is hereby corrected as shown below:

IN THE CLAIMS

Claim 11, column 6, line 48, after "facets" delete ",".

Signed and Sealed this
Fifth Day of August, 2014

Michelle K. Lee
*Deputy Director of the United States Patent and Trademark Office*